(12) United States Patent
Villanueva

(10) Patent No.: US 11,797,548 B2
(45) Date of Patent: Oct. 24, 2023

(54) ACHIEVEMENT BASED RATING SYSTEM AND METHODS WITH A DYNAMIC TAXONOMY

(71) Applicant: Entres LLC, Lee's Summit, MO (US)

(72) Inventor: Daniel A. Villanueva, Lee's Summit, MO (US)

(73) Assignee: Entres LLC, Lee's Summit, MO (US)

( * ) Notice: Subject to any disclaimer, the term of this patent is extended or adjusted under 35 U.S.C. 154(b) by 0 days.

(21) Appl. No.: 17/589,922

(22) Filed: Feb. 1, 2022

(65) Prior Publication Data

US 2023/0088183 A1 Mar. 23, 2023

Related U.S. Application Data

(60) Provisional application No. 63/246,860, filed on Sep. 22, 2021.

(51) Int. Cl.
*G06F 16/2457* (2019.01)
*G06N 5/01* (2023.01)

(52) U.S. Cl.
CPC ......... *G06F 16/24578* (2019.01); *G06N 5/01* (2023.01)

(58) Field of Classification Search
CPC .................. G06F 16/24578; G06N 5/003
See application file for complete search history.

(56) References Cited

U.S. PATENT DOCUMENTS

| | | | |
|---|---|---|---|
| 9,152,694 B1* | 10/2015 | Padidar | G06F 21/51 |
| 2013/0071089 A1* | 3/2013 | Fujimoto | G06F 16/7867 386/241 |
| 2013/0198193 A1* | 8/2013 | Chitiveli | G06F 16/353 707/E17.089 |
| 2015/0213022 A1* | 7/2015 | Agarwal | G06F 16/24573 707/731 |
| 2020/0387675 A1* | 12/2020 | Nugent | G06F 16/35 |
| 2021/0097626 A1* | 4/2021 | Ben-Simhon | G06F 16/23 |

OTHER PUBLICATIONS

International Search Report and Written Opinion for PCT Application No. PCT/US2022/042108 (dated Sep. 22, 2022).

* cited by examiner

*Primary Examiner* — Ken Hoang
(74) *Attorney, Agent, or Firm* — HOVEY WILLIAMS LLP

(57) ABSTRACT

A system and computer-implemented method includes providing first item rating scores for items associated with stored item data. The items are arranged in an initial item taxonomy that includes a first item assigned to a first initial item category. The system receives additional item data associated with the first item and transmits the data to a machine learning (ML) execution tool used to identify an applicable computer model. The system retrieves the item data and processes it using the computer model. The system revises the initial item taxonomy to create a revised item taxonomy including a new item category. The system reassigns the item to the new item category and generates one or more achievement requirements for all of the items. The system determines achievement point values for the achievement requirements for each item and calculates a second item rating score based on the achievement point values.

20 Claims, 7 Drawing Sheets

ACHIEVEMENT BASED RATING SYSTEM AND METHODS WITH A DYNAMIC TAXONOMY

CROSS-REFERENCE TO RELATED APPLICATIONS

This application claims the priority benefit of U.S. Provisional Patent Application Ser. No. 63/246,860 titled "ROLLING INTERVAL DIMINISHING VALUE RATING SYSTEM" and filed Sep. 22, 2021, the entire disclosure of which is incorporated herein by reference.

FIELD OF THE DISCLOSURE

The present disclosure generally relates to a rating system and, more particularly, to an achievement-based rating system with a dynamic taxonomy and that accounts for merchant characteristics and product availability.

BACKGROUND

Known food and beverage rating systems include star rating systems (e.g., five (5) star systems) and scoring systems (e.g., 1-10 tier, 1-100%, etc.). These rating systems typically permanently keep item ratings for the life of the item. For example, a first exemplary system utilizes an arbitrary five (5) star rating system that provides ratings for breweries as a whole and for individual beers served at those breweries. The first exemplary rating system does not group like items together nor does the system account for individual merchant characteristics. Further, the permanency of the ratings can mislead consumers. For example, prior to the present filing, the first exemplary system's list of top-rated beers showed an Imperial Double Stout rated as 4.75 out of 5 stars with 2,728 ratings. The list also includes a slightly lower rated beer, which is also an Imperial Double Stout, rated as 4.74 out of 5 stars with 27,841 ratings. A consumer could conclude that the lower rated stout with 27,841 ratings is a higher rated beer because of the significantly higher population rating the beer 4.74 stars. However, both beers are listed as no longer being produced by the brewery. Thus, the ratings and list are of little value to a consumer searching for available top-rated beers.

Another exemplary rating system currently only uses the one hundred (100) most ratings received for a delivery driver. When a new rating is received, the most distant in time rating falls off. This aspect of the rating system is referred to as a "rolling basis." This second exemplary rating system falsely represents the delivery drivers' ratings due to the arbitrary selection of timeframe for review described above. For example, a first delivery driver could have his or her ratings span only weeks due to delivering more orders, while a second delivery driver could have ratings that span months.

BRIEF SUMMARY

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a server system is provided. The system includes a database storing item data associated with a plurality of items. The plurality of items is arranged in an initial item taxonomy and includes a first item assigned to a first initial item category of the initial item taxonomy. The system also includes a processor coupled to the database. The processor is programmed to provide a first item rating score for each item of the plurality of items in the initial item taxonomy. The processor receives a data submission associated with the first item. The data submission includes additional item data. The processor transmits the additional item data to a machine learning (ML) execution tool. Using the ML execution tool, the processor identifies a computer model applicable to the additional item data. The processor retrieves the item data from the database. Additionally, the processor processes the item data and the additional item data using the identified computer model. Furthermore, based on the processing, the processor revises the initial item taxonomy to create a revised item taxonomy including a new item category. The processor reassigns the first item to the new item category of the revised item taxonomy. Based on the processing, the processor generates one or more achievement requirements for each item of the plurality of items. Furthermore, for each item of the plurality of items, the processor determines one or more achievement point values for the one or more achievement requirements. Moreover, the processor calculates a second item rating score for each item of the plurality of items based on the one or more achievement point values and the one or more achievement requirements.

In another aspect, a computer-implemented method is provided. The method is performed by a server system. The method includes providing a first item rating score for each item of a plurality of items. The plurality of items is associated with item data stored in a database. The plurality of items is arranged in an initial item taxonomy and includes a first item assigned to a first initial item category of the initial item taxonomy. The method also includes receiving a data submission associated with the first item. The data submission includes additional item data. The method includes transmitting the additional item data to a machine learning (ML) execution tool. The method also includes using the ML execution tool to identify a computer model applicable to the additional item data. In addition, the method includes retrieving the item data from the database. Furthermore, the method includes processing the item data and the additional item data using the identified computer model. Based on the processing, the method includes: revising the initial item taxonomy to create a revised item taxonomy including a new item category; reassigning the first item to the new item category of the revised item taxonomy; and generating one or more achievement requirements for each item of the plurality of items. Moreover, the method includes determining, for each item of the plurality of items, one or more achievement point values for the one or more achievement requirements. Additionally, the method includes calculating a second item rating score for each item based on the one or more achievement point values and the one or more achievement requirements.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE FIGURES

The figures described below depict various aspects of systems and methods disclosed therein. Each figure depicts an embodiment of a particular aspect of the disclosed devices and methods, and each of the figures is intended to accord with a possible embodiment thereof. Further, wherever possible, the following description refers to the reference numerals included in the following figures, in which features depicted in multiple figures are designated with consistent reference numerals. The present embodiments are not limited to the precise arrangements and instrumentalities shown in the figures.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein. The features, aspects, and advantages of the present disclosure will become better understood when the following detailed description is read with reference to the accompanying figures in which like characters represent like components throughout the figures.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. The scope of the present invention is defined only by the appended claims, along with the full scope of equivalents to which such claims are entitled.

As used herein, the term "database" includes either a body of data, a relational database management system (RDBMS), or both. As used herein, a database includes, for example, and without limitation, a collection of data including hierarchical databases, relational databases, flat file databases, graph databases, object-relational databases, object-oriented databases, and any other structured collection of records or data that is stored in a computer system. Examples of RDBMS's include, for example, and without limitation, Oracle® Database (Oracle is a registered trademark of Oracle Corporation, Redwood Shores, Calif.), MySQL, IBM® DB2 (IBM is a registered trademark of International Business Machines Corporation, Armonk, N.Y.), Microsoft® SQL Server (Microsoft is a registered trademark of Microsoft Corporation, Redmond, Wash.), Sybase® (Sybase is a registered trademark of Sybase, Dublin, Calif.), and PostgreSQL® (PostgreSQL is a registered trademark of PostgreSQL Community Association of Canada, Toronto, Canada). However, any database may be used that enables the systems and methods to operate as described herein.

Exemplary System

Figure 1:
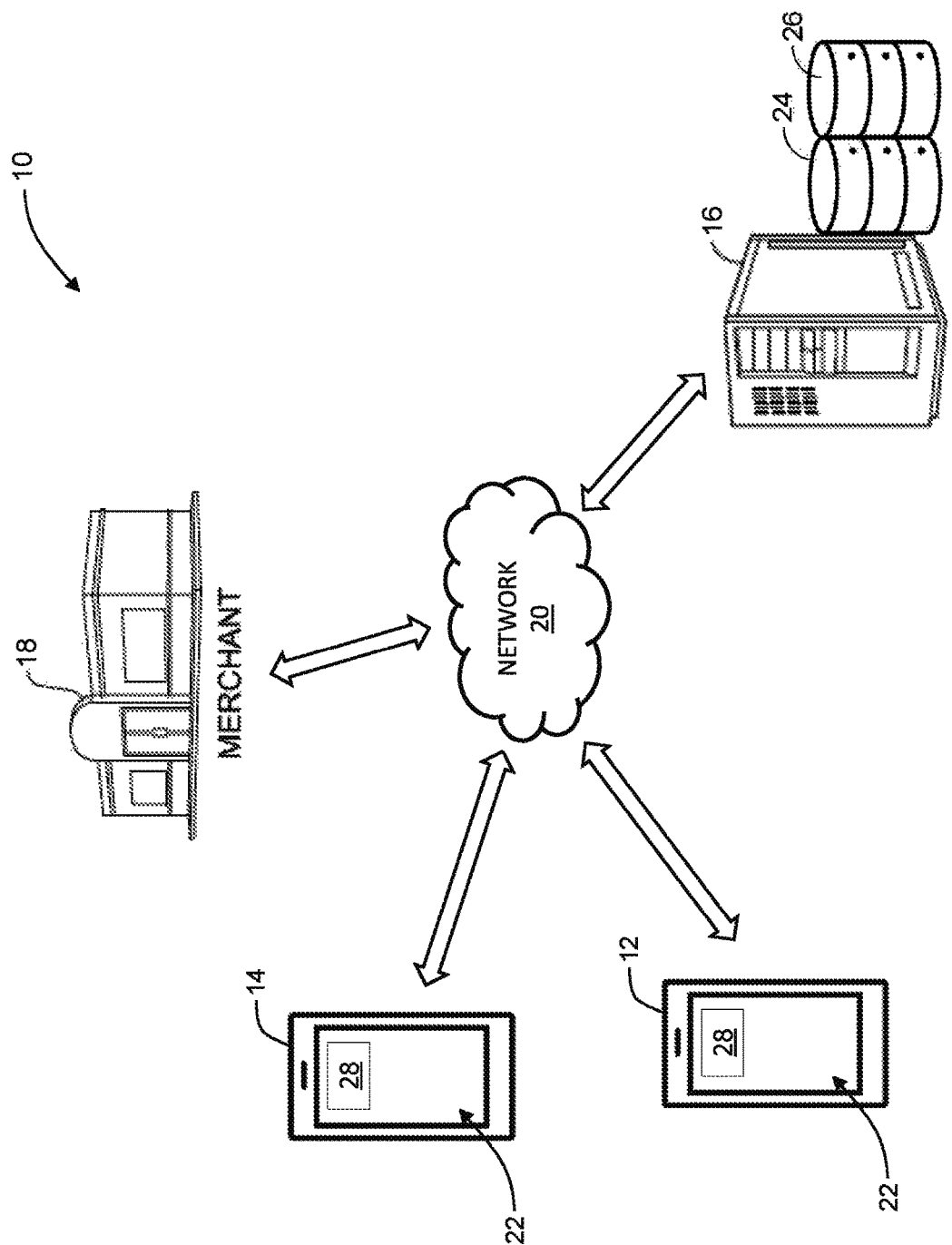
FIG. 1 is a schematic diagram of an exemplary computing environment for providing an item rating system, and including one or more user computing device(s), according to one aspect of the present invention.

FIG. 1 is a schematic diagram of an exemplary computing environment 10 for providing an item rating system, according to one aspect of the present invention. In the example embodiment, the environment 10 includes a plurality of user computing devices, such as user computing devices 12 and 14; a server 16; a merchant 18; and a communication network 20. The user computing devices 12 and 14, the server 16, and one or more computing devices 30 (shown in FIG. 4) of the merchant 18 are coupled in communication via the communication network 20.

The communication network 20 generally allows communication between the server 16 and the merchant 18, for example, via one or more APIs (not shown). The communication network 20 may also generally allow communication between the user computing devices 12 and 14 and the server 16, for example, in conjunction with a common authentication framework and/or secure transmission protocol(s).

The communication network 20 may include the internet, cellular communication networks, local area networks, metro area networks, wide area networks, cloud networks, plain old telephone service (POTS) networks, and the like, or combinations thereof. The communication network 20 may be wired, wireless, or combinations thereof and may include components such as modems, gateways, switches, routers, hubs, access points, repeaters, towers, and the like. The user computing devices 12 and 14, server 16, and/or computer 30 of the merchant 18 may, for example, connect to the communication network 20 either through wires, such as electrical cables or fiber optic cables, or wirelessly, such as RF communication using wireless standards such as cellular 2G, 3G, 4G or 5G, Institute of Electrical and Electronics Engineers (IEEE) 802.11 standards such as Wi-Fi, IEEE 802.16 standards such as WiMAX, Bluetooth™, or combinations thereof.

The server 16 may manage item and/or ratings data transmissions, queries, and transmission of responsive ratings data, and perform related analytical functions (e.g., data categorization and ratings calculations) in accordance with the description set forth herein. In one or more embodiments, the item data may be acquired by any means, and the steps for analysis laid out herein may be requested and/or performed by different computing devices (or by a single computing device), without departing from the spirit of the present invention.

The item data and/or ratings data may be stored in one or more databases, such as database 24, managed by the server 16 utilizing any of a variety of formats and structures. For example, relational databases and/or object-oriented databases may embody the database 24. Similarly, database 24 may utilize a variety of formats and structures, such as Simple Object Access Protocol (SOAP), Remote Procedure Call (RPC), and/or Representational State Transfer (REST) types. One of ordinary skill will appreciate that—while examples presented herein may discuss specific types of databases—a wide variety may be used alone or in combination within the scope of the present invention.

Exemplary Computer Systems

Figure 2:
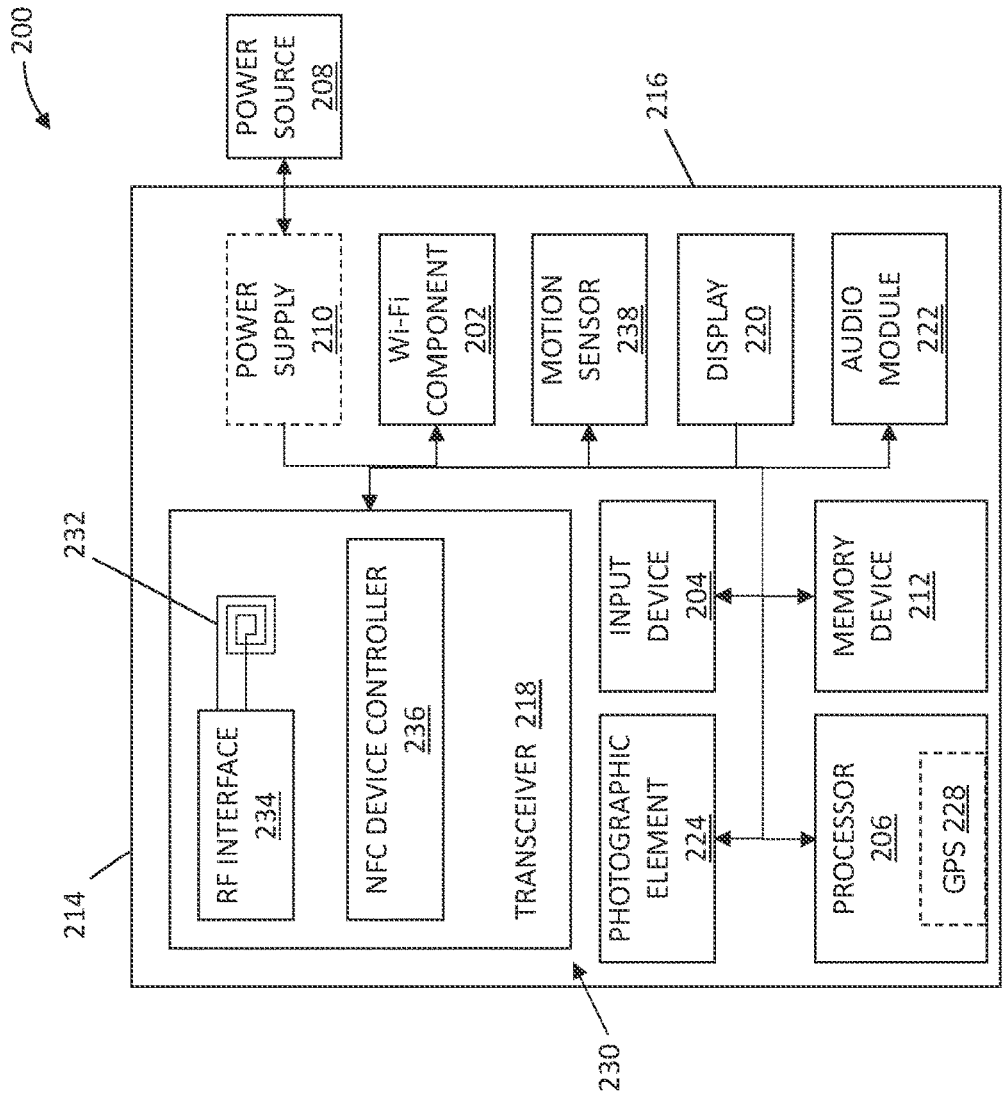
FIG. 2 is an example configuration of the user computing device of the system shown in FIG. 1.

FIG. 2 is an example configuration of a user computing device 200, such as the user computing devices 12 and 14 (shown in FIG. 1), that may be operated by a user (not shown). In the exemplary embodiment, the computing device 200 is a computing device configured to connect to the communication network 20 (shown in FIG. 1). Via the communication network 20, the computing device 200 may connect to one or more of the server 16, the merchant 18, and any other computing devices, such as other consumer computing devices.

In the exemplary embodiment, the computing device 200 generally includes a processor 206, a memory device 212, a transceiver 218 (or a wireless communication device), and a photographic element 224. In addition, the computing device 200 includes an integrated Wi-Fi component 202 (e.g., implementing the Institute of Electrical and Electronics/IEEE 802.11 family of standards), an input device 204, a display 220, and an audio module 222. Moreover, the computing device 200 optionally includes an internal power supply 210 (e.g., a battery or other self-contained power source) to receive power, or alternatively, in some embodiments, the computing device 200 may include an external power source 208. Optionally, the computing device 200 may include a motion sensor 238.

The processor 206 includes one or more processing units (e.g., in a multi-core configuration) specially programmed for executing computer readable instructions. The instructions may be executed within a variety of different operating systems (OS) on the computing device 200. More specifically, the instructions may cause various data manipulations on data stored in the memory device 212 (e.g., create, read, write, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.). The memory device 212 is any device allowing information, data, the executable instructions, and/or written works to be stored and retrieved. The memory device 212 includes one or more computer readable media.

Because the computing device 200 may be widely deployed, it may be impractical to manually update software for each computing device 200. Therefore, the environment 10 may provide a mechanism for automatically updating the software on the computing device 200. For example, an updating mechanism may be used to automatically update any number of components and their drivers, both network and non-network components, including system level (OS) software components. In some embodiments, the computing device 200 components are dynamically loadable and unloadable; thus, they may be replaced in operation without having to reboot the OS.

A location of the computing device 200 can be obtained through conventional methods, such as a location service (e.g., global positioning system (GPS) service) in the computing device 200, "ping" data that includes geotemporal data, from cell location register information held by a telecommunications provider to which the computing device 200 is connected, and the like. For example, in one suitable embodiment, an optional GPS chip 228 can be part of or separate from the processor 206 to enable the location of the computing device 200 to be determined.

The Wi-Fi component 202 (broadly, a communication interface) may be communicatively connectable to a remote device such as a wireless modem/router (not shown), the communication network 20 (shown in FIG. 1), the server 16 (shown in FIG. 1), and/or the merchant 18 (shown in FIG. 1). The Wi-Fi component 202 may include, for example, a wireless or wired network adapter or a wireless data transceiver for use with Wi-Fi (e.g., implementing the Institute of Electrical and Electronics/IEEE 802.11 family of standards), Bluetooth communication, radio frequency (RF) communication, near field communication (NFC), and/or with a mobile phone network, Global System for Mobile communications (GSM), 3G, or other mobile data network, and/or Worldwide Interoperability for Microwave Access (WiMAX) and the like.

Stored in the memory device 212 are, for example, computer readable instructions for providing a user interface, such as a user interface 22 (shown in FIG. 1), to the user via the display 220 and, optionally, receiving and processing input from the input device 204. A user interface may include, among other possibilities, a web browser and a client application. Web browsers enable users to view and interact with media and other information typically embedded on a web page or a website. A client application 28 allows the user to interact with a server application, for example, associated with the server 16.

The photographic element 224 may include a camera or other optical sensor and lens combination capable of generating a video signal and capturing an image, iris scan, and the like. In various embodiments, the photographic element 224 may be integrated in a housing or body, such as a housing 214 of the computing device 200. When the photographic element 224 captures an image or otherwise generates image data (e.g., video data), the photographic element 224 may store the image data in a data file, either in a raw or compressed format, in the memory device 212.

In some embodiments, the motion sensor 238 may include one or more sensor elements that facilitate detecting a person's presence. For example, in an embodiment, the motion sensor 238 detects when a user moves or raises the computing device 200. Upon detection of such motion, the photographic element 224 may begin capturing images (e.g., still or video images), the transceiver 218 may be activated, and/or the audio module 222 may begin capturing audio. The motion sensor 238 may be operatively coupled to the photographic element 224 such that the user's presence may be detected by detecting motion using the photographic element 224. The motion sensor 238 may include, for example, and without limitation, sensor elements such as a passive infrared sensor, an ambient light sensor, and the like.

In the example embodiment, the display 220 can include, for example, and without limitation, a liquid crystal display (LCD), an organic light emitting diode (OLED) display, or an "electronic ink" display. In some embodiments, a single component such as a touch screen may function as both an output device (e.g., the display 220) and the input device 204. As such, the display 220 may optionally include a touch controller for support of touch capability. In such embodiments, the computing device 200 may detect a user's presence by detecting that the user has touched the display 220 of the computing device 200.

The audio module 222 may include, for example, and without limitation, a speaker and related components capable of broadcasting streaming and/or recorded audio and may also include a microphone. The microphone facilitates capturing audio through the computing device 200.

In the example embodiment, the computing device 200 includes the housing 214 at least partly (and more preferably, at least substantially or entirely) enclosing the components described above. In addition, the computing device 200 includes circuitry 230 configured to communicate with the communication network 20 (shown in FIG. 1) and/or other computing devices. The circuitry 230 may include, for example, leads, connectors, NFC-enabled circuitry, Wi-Fi-enabled circuitry, and photographic element circuitry. The housing 214 is preferably configured to seal the circuitry 230, which is susceptible to degradation from the ambient environment. In one embodiment, the circuitry 230 is hermetically sealed in the housing 214. For example, in one embodiment, the circuitry 230 is completely and permanently encased within the housing 214. In other words, the housing 214 and the circuitry 230 are intended to remain as a single, inseparable unit throughout the life of the computing device 200. It is understood that the housing 214 can be formed separately from the circuitry 230 and that the circuitry 230 can be placed into and sealed within the housing 214 in a separate operation. It is also understood that the housing 214 can be oversized with respect to the circuitry 230 so that the circuitry 230 can be placed loosely into the housing 214. In another embodiment, the circuitry 230 can be selectively, sealingly enclosed within the housing 214, where the housing 214 includes a closure 216 removably attached to a body of the housing 214.

The housing 214 is fabricated from a suitably selected material that facilitates inhibiting the effect the material has on the signal being emitted from, for example, the transceiver 218 and/or the Wi-Fi component 202 and passing through the housing material. For example, and without limitation, suitable materials from which the housing 214 may be fabricated include polyethylene, propylene, isoprene, and butylenes (i.e., polyolefins). In other embodiments, the housing 214 is fabricated from any material that enables the computing device 200 to function as described herein, such as metals, etc.

In one embodiment, the transceiver 218 includes an antenna 232. The antenna 232 includes a looped wire configured to transmit radio signals when current flows through the looped wire. The antenna 232 is any size, shape, and configuration that is suitable for transmitting signals as described herein. For example, the antenna 232 is a tuned circuit configured to transmit radio signals in any radio-based communication system including, but not limited to, Radio Frequency Identification (RFID), Wireless Local Area Network (WLAN), and Wireless Personal Area Network (WPAN) systems. In the example embodiment, the antenna 232 generates a magnetic field when it vibrates at a selected frequency. Specifically, the antenna 232 is configured to vibrate at a frequency of about 13.56 MHz, which is suitable for use in a near field communication (NFC) system.

In the example embodiment, the antenna 232 transmits radio signals to and receives radio signals from other wireless-enabled computing devices, for example, another mobile device, a merchant point-of-sale (POS) terminal (not shown) (e.g., for item payment via the ratings application 28 for purchase verification), and/or any other components used in wireless systems. In NFC systems, for example, at least one NFC component generates a magnetic field to inductively transfer currents and, thereby, exchange signals and information with other NFC components positioned within the magnetic field. In one example embodiment, the antenna 232 functions as an NFC component to send and receive signals. The antenna 232 is configured to transmit radio signals to NFC components positioned within the magnetic field of the antenna 232, such as when the computing device 200 is located within a predetermined distance of a POS terminal. Accordingly, the magnetic field generated by the antenna 232 defines the active range of the computing device 200. Additionally, the antenna 232 receives radio signals from NFC components when the antenna 232 is positioned within the magnetic field of the NFC components. NFC payments may be used by the ratings application 28 for item purchase verification.

The transceiver 218 also includes a radio frequency (RF) interface 234 and an NFC device controller 236. The RF interface 234 and the NFC device controller 236 are powered by the power source 208, and in some embodiments, the internal power supply 210 and/or the display 220. In addition, the processor 206 and the memory device 212 are powered in the same manner. The RF interface 234 is configured to receive and transmit RF signals through the antenna 232. The NFC device controller 236 is configured to process the received RF signals and to generate signals to be transmitted by the RF interface 234. The memory device 212 is configured to store data associated with transmitting and receiving the RF signals. The NFC device controller 236 is coupled in communication with the processor 206.

In some embodiments, the computing device 200 may be connected to one or more peripheral devices (not shown). That is, the computing device 200 may communicate various data with one or more peripheral devices. For example, the computing device 200 may communicate with one or more peripheral devices through the Wi-Fi component 202, the transceiver 218, or other suitable means.

Figure 3:
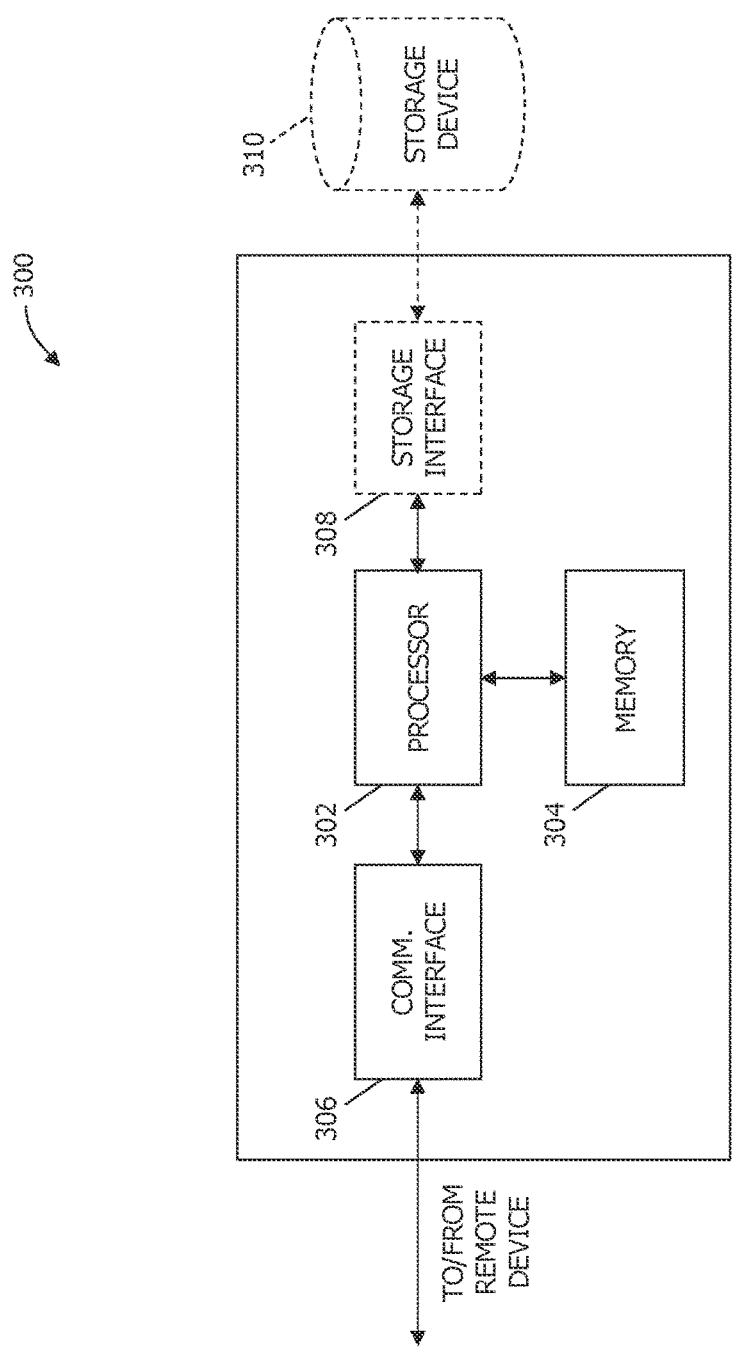
FIG. 3 is an example configuration of a server system of the system shown in FIG. 1.

FIG. 3 is an example configuration of a server system 300, such as the server 16 (shown in FIG. 1). The server system 300 includes, but is not limited to, the database 24 (shown in FIG. 1). In the example embodiment, the server system 300 includes a processor 302 for executing instructions. The instructions may be stored in a memory area 304, for example. The processor 302 includes one or more processing units (e.g., in a multi-core configuration) for executing the instructions. The instructions may be executed within a variety of different operating systems on the server system 300. More specifically, the instructions may cause various data manipulations and analysis on data stored in a storage device 310. It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.).

The processor 302 is operatively coupled to a communication interface 306 such that the server system 300 can communicate, for example, with the communication network 20 and/or a remote device, such as a user computing device 200 (shown in FIG. 2), computer 30 of the merchant 18, and/or another server system. For example, the communication interface 306 may receive communications from a computing device 200 and/or the merchant 18 via the internet.

The processor 302 is operatively coupled to the storage device 310. The storage device 310 is any computer-operated hardware suitable for storing and/or retrieving data. In some embodiments, the storage device 310 is integrated in the server system 300. In other embodiments, the storage device 310 is external to the server system 300 and is similar to the database 24. For example, the server system 300 may include one or more hard disk drives as the storage device 310. In other embodiments, the storage device 310 is external to the server system 300 and may be accessed by a plurality of server systems. For example, the storage device 310 may include multiple storage units such as hard disks or solid-state disks in a redundant array of inexpensive disks (RAID) configuration. The storage device 310 may include a storage area network (SAN) and/or a network attached storage (NAS) system.

In some embodiments, the processor 302 is operatively coupled to the storage device 310 via a storage interface 308. The storage interface 308 is any component capable of providing the processor 302 with access to the storage device 310. The storage interface 308 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 302 with access to the storage device 310.

The memory area 304 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

Exemplary Ratings Platform

Figure 4:
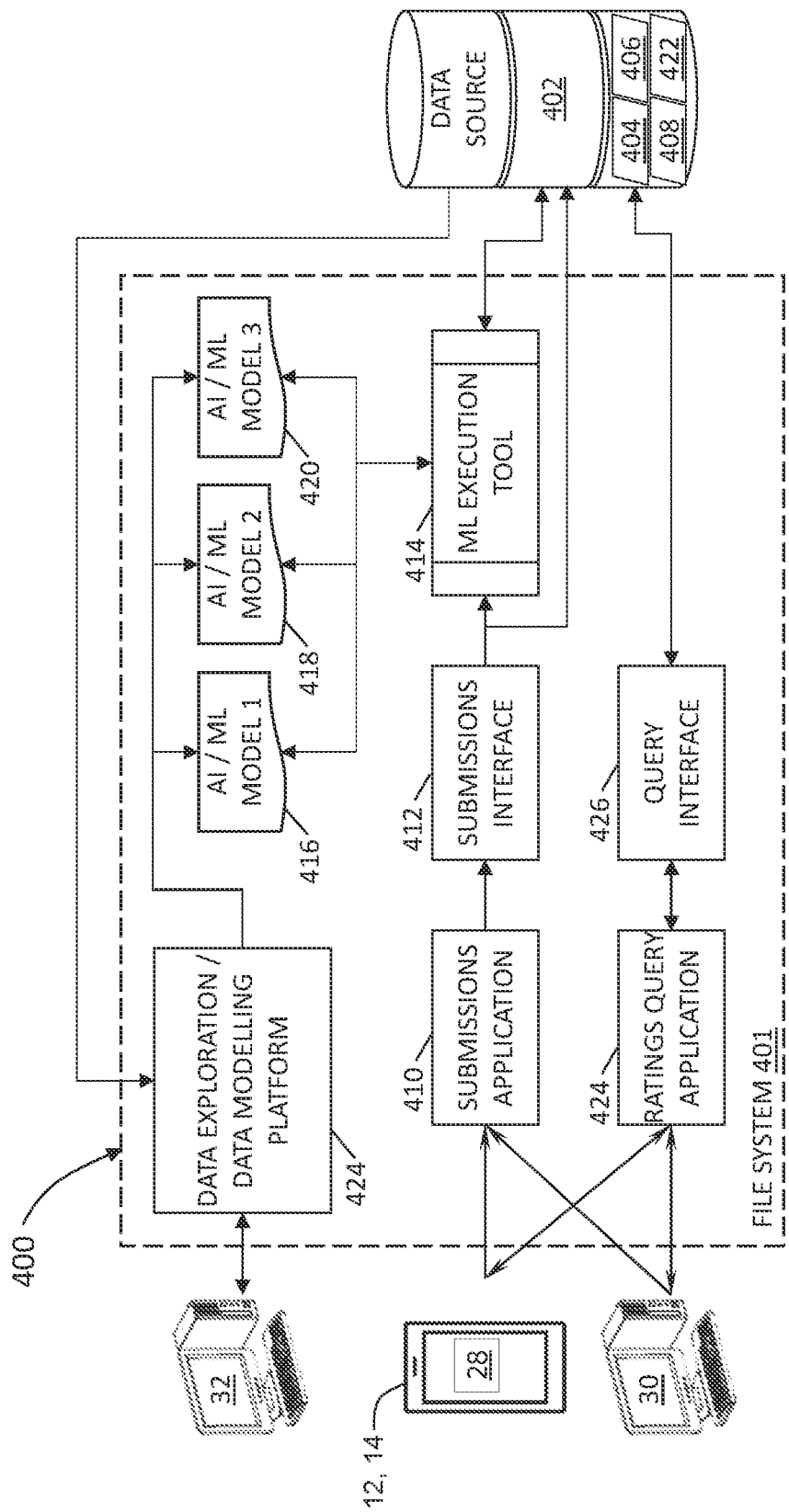
FIG. 4 is an architectural diagram of an item ratings platform, in accordance with one or more aspects of the present invention.

FIG. 4 is an architectural diagram of an item ratings platform 400 (otherwise referred to herein as the "ratings platform 400"), in accordance with one or more aspects of the present invention. The diagram depicts various components of exemplary systems for querying and or exchanging information with data sources, such as a data source 402, and of relationships between the components. The ratings platform 400, at a high level, operates on a file system 401 of a server, such as the server 16 (shown in FIG. 1). The ratings platform 400 is connectable to the user computing devices 12, 14, and the merchant computer 30. The computing devices 12, 14 are utilized by a user (not shown) to transmit ratings queries and/or item ratings data 404, via a ratings application 28, to an interface system. In addition, the merchant 18 transmits merchant information 406 and items data 408 to the interface system. The application 28 and/or interface system may be deployed, for example, on the server 16, the merchant computer 30, and/or the computing devices 12, 14. The ratings queries are configured to query item ratings based, for example, on the merchant information 406, the items data 408, and/or the item ratings data 404 persisted or stored in the data source 402.

For receiving data for generating ratings, the ratings platform 400 includes a submissions application 410 (e.g., an open database connectivity (ODBC) connection, custom application, etc.) configured to receive data, such as the item ratings data 404, merchant information 406, and/or the items data 408, input by the user via a computing device 12, 14, or the merchant 18 via the computer 30. The submissions application 410 is electronically interfaced to a submissions interface 412, which is configured to receive data submissions from the submissions application 410 and transmit the data to the data source 402 for storage. A machine learning (ML) execution tool 414 is electronically interfaced to the submissions interface 412, the data source 402, and a plurality of artificial intelligence (AI)/machine learning (ML) models, such as AI/ML models 416, 418, and 420. In one embodiment, the ML execution tool 414 receives the data submissions from the submissions interface 412, parses the data to ascertain the type of data being submitted, transmits the data to the data source 402, and based on the ascertained data types, selects one or more of the AI/ML models 416, 418, and 420 for execution. The ML execution tool 414 retrieves relevant data, such as item ratings data 404, merchant information 406, and the items data 408, from the data source 402 and executes the selected model(s) using the newly submitted data and the retrieved item ratings data 404, merchant information 406, and the items data 408. The results (e.g., item rating or score) are calculated and stored in the data source 402 as ratings data 422.

For a ratings data query, the ratings platform 400 includes a ratings query application 424 (e.g., an ODBC connection, custom application, etc.) configured to receive one or more selected parameters input by a user, for example, via a computing device 12, 14. The ratings query application 424 is electronically interfaced to a query interface 426 that is configured to receive a ratings query from the ratings query application 424. The query interface 426 is electronically interfaced to the data source 402. The query interface 426 receives the ratings query from the ratings query application 424, parses the ratings query to ascertain the selected parameters input by the user, and based on the ascertained parameters, retrieves ratings data 422 associated with the selected parameters. The results (e.g., the queried ratings data) are returned to the query interface 426, where they are presented to the user via the ratings query application 424.

In certain embodiments, the ratings platform 400 optionally includes a data exploration/data modelling platform 428 electronically interfaced to a computing device 32 operated, for example, by a developer and/or analyst (not shown). The data exploration/data modelling platform 428 is also electronically interfaced to the data source 402. The developer and/or analyst develops AI/ML models, such as the AI/ML models 416, 418, and 420, using, for example, the item ratings data 404, merchant information 406, and/or the items data 408. For example, and without limitation, the developer and/or analyst selects certain data to be used for a new model. The data is selected, for example, based on a thorough analysis and understanding of the data. The selected data is prepared as training data and a model is generated therefrom. The trained model is evaluated and deployed as an AI/ML model available to the ML execution tool 414 for generating ratings data 422.

Exemplary Computer-Implemented Methods

Figure 5:
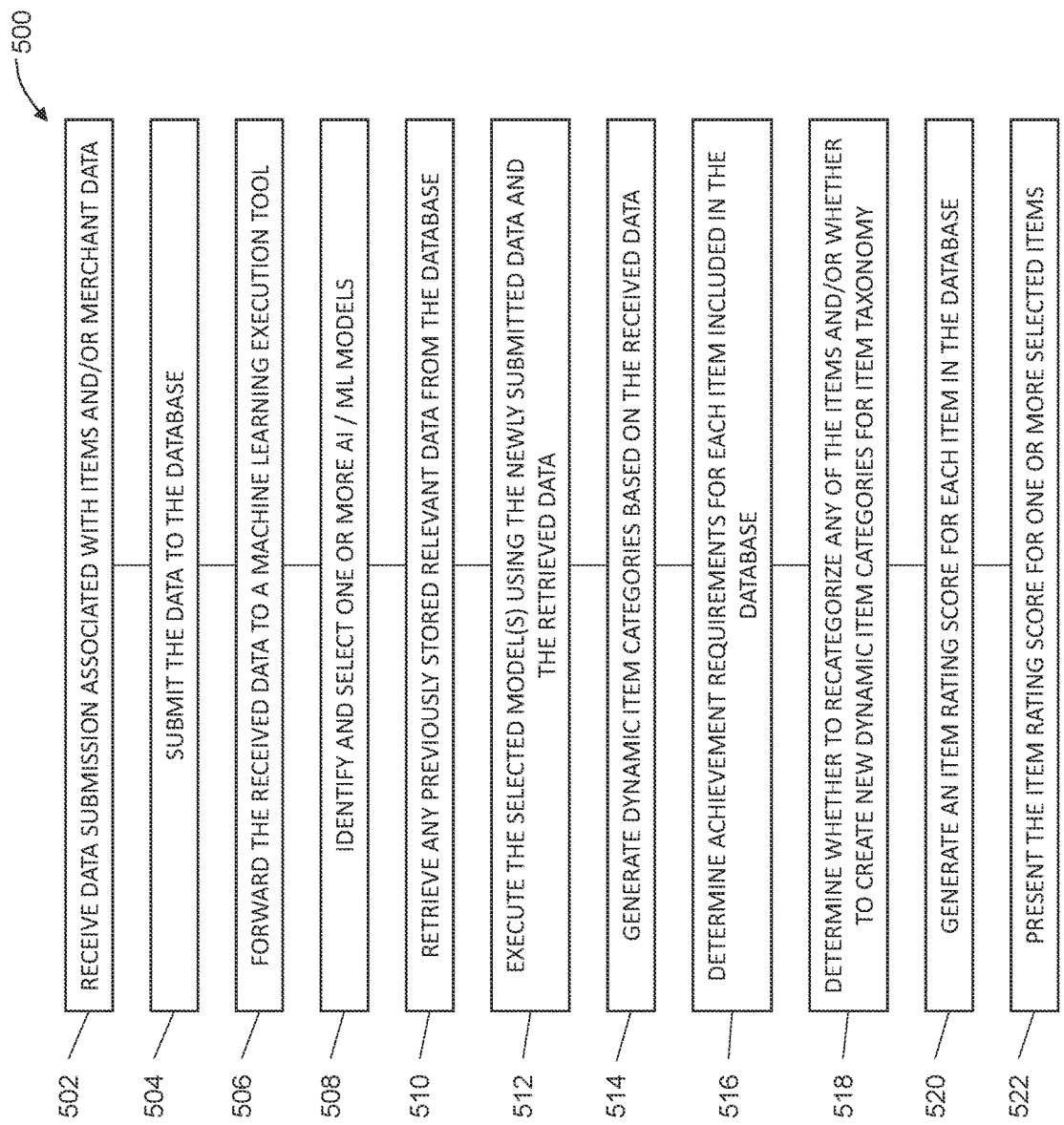
FIG. 5 is a flowchart illustrating an exemplary computer-implemented method for determining ratings for items in a selected category, across all merchants, with the ratings being adjusted for merchant characteristics, in accordance with one embodiment of the present disclosure.

FIG. 5 is a flowchart illustrating an exemplary computer-implemented method 500 for determining ratings for items in a selected category, across all merchants, with the ratings being adjusted for merchant characteristics, in accordance with one embodiment of the present disclosure. The operations described herein may be performed in the order shown in FIG. 5 or may be performed in a different order. Furthermore, some operations may be performed concurrently as opposed to sequentially. In addition, some operations may be optional.

The computer-implemented method 500 is described below, for ease of reference, as being executed by exemplary devices and components introduced with the embodiments illustrated in FIGS. 1-4. In one embodiment, the method 500 may be implemented by the item ratings platform 400 implemented by the server 16 (shown in FIG. 1). In the exemplary embodiment, the method 500 relates to calculating item ratings for various items submitted by a merchant and/or consumer, wherein the calculated ratings consider merchant characteristics and period when consumer review(s) are submitted. While operations within the method 500 are described below regarding the server 16, the method 500 may be implemented on other such computing devices and/or systems through the utilization of processors, transceivers, hardware, software, firmware, or combinations thereof. However, a person having ordinary skill will appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

Figure 6:
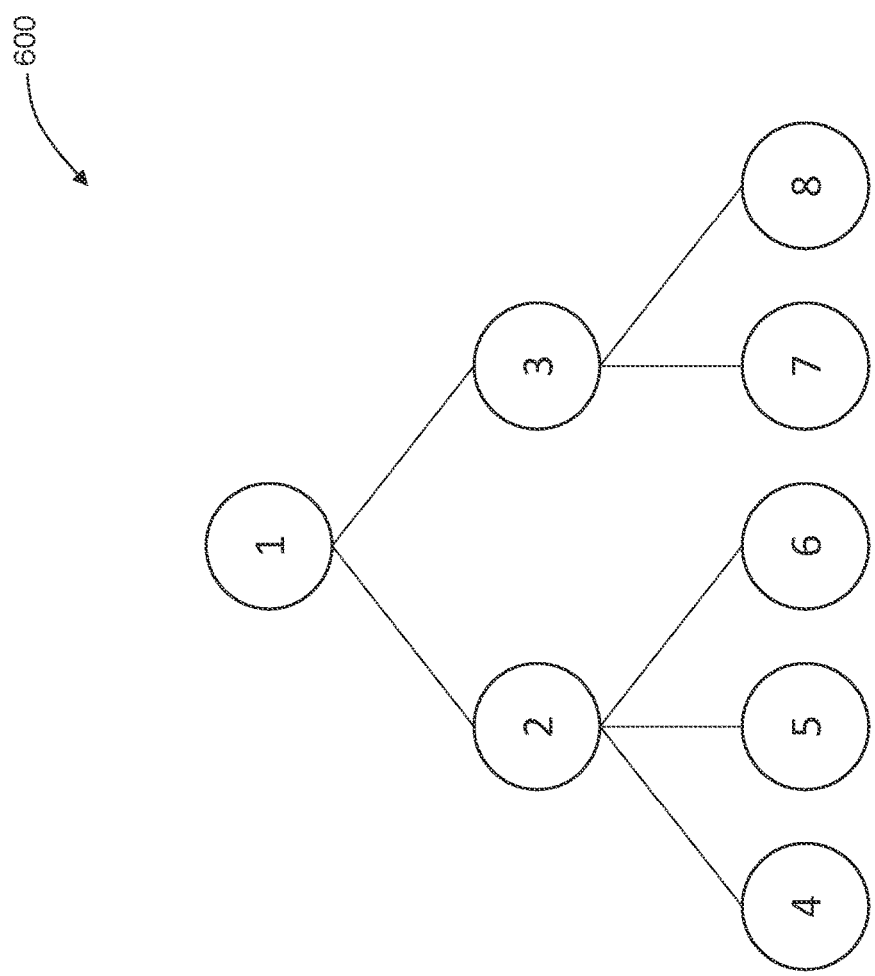
FIG. 6 is an example portion of an initial item taxonomy, represented in a tree-like structure.

Generally, in a production environment, the item ratings platform 400 provides a first item rating score (also referred to as a standardized rating score) for each item in an initial item taxonomy (shown in FIG. 6). At operation 502, the ratings platform 400 receives a data submission associated with items and/or merchant data, for additional ratings calculations and storage in a database, such as the data source 402 (shown in FIG. 4). For example, in an aspect of the invention, the submissions application 410 (shown in FIG. 4) receives merchant information 406 and/or items data 408 from a merchant 18, via the merchant computer 30. In an example associated with restaurants, the merchant information 406 may include, for example, one or more of a merchant location or plurality of locations, a merchant type and category (e.g., restaurant—Mexican), merchant contact information, and the like. The items data 408 may include, for example, a list of items offered by the merchant 18 (e.g., a menu, etc.), a list of ingredients for each item, serving temperature, item description, item photos, and the like. Furthermore, in certain aspects, the submissions application 410 receives item ratings data 404 from a consumer, via a user computing device 12,14. In a restaurant associated example, the item ratings data 404 may include, for example, selection of one or more purchased items, a textual review or description of the item(s), a user rating (for example, and without limitation, 1-5 star rating, score between 1-10, or any other rating system), a photo of the item(s), purchase verification data, a merchant location where the item was purchased, and the like.

The received data, such as item ratings data 404, merchant information 406, and the items data 408, is forwarded to the submissions interface 412 (shown in FIG. 4), for example, by the submissions application 410. For example, in one embodiment, the submissions application 410 operates as a user interface for the submissions interface 412 and as the merchant and items data are input into the submissions application 410, the submissions application 410 generates machine-readable data, which is automatically input/read by the submissions interface 412.

At operation 504, the submissions interface 412 recognizes the machine-readable data as formatted in an appropriate form and proceeds to submit the machine-readable data to the database, such as the data source 402. If the machine-readable data is formatted incorrectly or is otherwise unrecognizable, the data source 402 rejects the submissions interface 412. The data source 402 may be implemented using various database software, including, for example, and without limitation, SQL Server, Oracle, DB2, PostgreSQL, and the like.

In the example embodiment, at operation 506, the submissions interface 412 may also forward the received data to the ML execution tool 414. For example, the ML execution tool 414 may intercept or otherwise receive the machine-readable data. The ML execution tool 414 parses the machine-readable query to ascertain the type(s) of data being submitted. That is, the ML execution tool 414 ascertains the type(s) of data contained in the machine-readable data. The types of data may include, for example, image data, textual data, etc.

At operation 508, the ML execution tool 414 identifies and selects one or more AI/ML models that are available for the submitted data. That is, the ML execution tool 414 identifies one or more AI/ML models, such as AI/ML models 416, 418, and 420 (shown in FIG. 4), that is configured for execution using one of the ascertained data types. The identification of the model(s) is based, at least in part, on required data type inputs identified for each of the respective AI/ML models, for example, in metadata associated with each respective AI/ML model.

At operation 510, the ML execution tool 414 retrieves any previously stored relevant data, such as item ratings data 404, merchant information 406, and the items data 408, from the data source 402. At operation 512, the ML execution tool 414 executes the selected model(s) using the newly submitted data and the retrieved item ratings data 404, merchant information 406, and the items data 408. In aspects of the disclosure, each model (or algorithm) utilizes the entirety of the data (i.e., the item ratings data 404, merchant information 406, and the items data 408) for analysis. Accordingly, every additional data point and/or item added to the data source 402 causes the system to update its calculations (e.g., the item rating or score).

At operation 514, the item ratings platform 400 identifies and/or generates one or more dynamic item categories based on the received information, such as the item ratings data 404 received from a consumer and/or the merchant information 406 and/or the items data 408 received from a merchant 18. Herein, the term "dynamic" indicates that a definition or boundaries of a category and/or the structure and/or included item categories of an item taxonomy change based on analysis of the submitted data. In one or more embodiments, the AI/ML models 416, 418, and 420 analyze the submitted data and any existing data retrieved from the data source 402 to determine one or more existing and/or new categories to assign existing items and/or item(s) associated with the submitted data to. That is, embodiments of the present invention programmatically analyze numerous variables associated with the submitted data. In example embodiments, as a result of the analysis and based on user input, the item ratings platform 400 assigns/reassigns items to a corresponding grouping, example category, and/or sub-category. In other embodiments, the item ratings platform 400 assigns/reassigns items to a corresponding grouping, example category, and/or subcategory without user input.

As described above, the submitted data can include, without limitation, item ingredients, merchant information, consumer ratings or reviews, images of the rated item, item availability, etc. In some embodiments, the received and stored item/merchant data is continuously analyzed for determination of one or more dynamic item categories. The AI/ML models may generate one or more dynamic item categories in the background at any point. The item ratings platform 400 may have a designated period of review/testing (e.g., by a system administrator) before the new one or more dynamic item categories are presented to the network. The addition of the one or more dynamic item categories revises the initial item taxonomy, defining a new revised item taxonomy including the one or more dynamic item categories (see FIG. 7). The use of the phrase "generates one or more dynamic item categories" includes one or more of the creation of an entirely new category and the deletion of a current category. Deletion of a current category, for example, may result in the items in that category being merged with items in another category, where the other category is defined as the dynamic item category.

The AI/ML models 416, 418, and 420 execute various techniques for analyzing data to identify patterns and solve problems that humans cannot possibly identify or solve. Machine learning techniques have been developed that allow parametric or nonparametric statistical analysis of large quantities of data. Such machine learning techniques may be used to automatically identify relevant variables (i.e., variables having statistical significance or a sufficient degree of explanatory power) from data sets. This may include identifying relevant variables or estimating the effect of such variables that indicate actual observations in the data set. This may also include identifying latent variables not directly observed in the data, such as variables inferred from the observed data points. In some embodiments, the methods and systems described herein may use machine learning techniques to identify and estimate the effects of observed or latent variables such as type of item, item ingredients, merchant-related data, consumer ratings for the items, and/or item images, or other such variables that influence the rating score of an item.

Use of the AI or machine learning techniques described herein, may begin with training a machine learning program, or such techniques may begin with a previously trained machine learning program, such as the AI/ML models 416, 418, and 420. The item ratings platform 400 (e.g., the model(s)) may be trained using supervised or unsupervised machine learning, and the AI/ML models 416, 418, and 420 may employ a neural network, which may be a convolutional neural network, a deep learning neural network, a combined learning module or program, and the like that learns in two or more fields or areas of interest. Additionally or alternatively, the AI/ML models 416, 418, and 420 may be trained by inputting sample data sets or certain data into the models (e.g., items, item ingredients, etc. as described herein). The machine learning programs may utilize deep learning algorithms that may be primarily focused on pattern recognition and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, the example AI/ML models 416, 418, and 420 may be provided with example inputs and their associated outputs and each may seek to discover a general rule that maps inputs to outputs, so that when subsequent novel inputs are provided to the models, based upon the discovered rule, accurately determines a correct output. In unsupervised machine learning, the AI/ML models 416, 418, and 420 may be required to find their own structure in unlabeled example inputs. In one embodiment, at least one of the AI/ML models 416, 418, and 420 may be used to extract data about the item(s) from image data.

In one embodiment, one or more of the AI/ML models 416, 418, and 420 may be trained by providing the model(s) with a large sample of initial and/or historical items and/or image data with known characteristics or features. Such information may be used to determine the initial item taxonomy 600 (shown in FIG. 6) for the item ratings platform 400. As described herein, the initial item taxonomy 600 is updated or revised with one or more new dynamic item categories to define a new revised item taxonomy 700 (shown in FIG. 7). Accordingly, the item taxonomy may be referred to as a dynamic taxonomy. Herein, the term "dynamic," as it relates to the item taxonomy, indicates that the structure and/or included item categories of the item taxonomy change based on analysis of the submitted data.

Based upon the above-described analyses, the AI/ML models 416, 418, and 420 may learn how to identify characteristics and patterns that may be applied to analyzing newly submitted image data and/or other data. For example, the AI/ML models 416, 418, and 420 may learn how to identify different types of items (for categorization) based upon differences in image data. For example, in a food item taxonomy, a bun with a meat patty in the middle may be identified as a burger, two pieces of bread with various meat and/or vegetable ingredients placed in between is likely a sandwich, a piece of flat bread dough with sauce and toppings is likely a pizza, etc. The basic categories (or taxonomy) framework is utilized to establish common ground between the merchants, such as the merchant 18, and customers when grouping items further. Further, the AI/ML models 416, 418, and 420 may learn how to identify different types of items based upon textual input data, including for example, ingredients, alone or in combination with image data. In some embodiments, the submitted text may be used to facilitate identifying the items in the image data. Further, the image data may be used to at least partly define one or more new dynamic item categories for the revised item taxonomy 700 (shown in FIG. 7) for the item ratings platform 400. For example, in one or more embodiments of a food item taxonomy, an item identified as a burger (e.g., an image of a bun with a meat patty in the middle) may share similar image data to an item that has a bun with a plant-based patty in the middle, which may have previously been identified as a sandwich. Textual input data may identify a meat patty in a bun as a burger and a plant-based patty in a bun as a sandwich. Image data analysis may be used to determine the differences between the similar images and update the dynamic taxonomy to define distinct categories, such as "Burger: meat" and "Burger: non-meat," respectively. Thus, recategorizing the items already in the system as well as placing new items within the new dynamic categories.

At operation 516, the item ratings platform 400 determines one or more achievement requirements for each item included in the database, such as the data source 402. The achievement requirements for each item are based, for example, on item groupings, achievement type, and characteristics of the merchant providing the item (e.g., merchant size, type, characteristics, etc.). The achievement type includes lifetime and period achievements. Lifetime achievements may have higher requirements, as they are set for the lifetime of the item. Period achievements are set for predetermined periods during the lifetime of the item. In some embodiments, the period achievements may be predetermined set periods, such as calendar quarters, yearly, etc. In other embodiments, the period achievements may be determined on rolling periods. For example, the model(s) (e.g., one or more of the AI/ML models 416, 418, and 420) may determine a thirty-day rolling window for attaining a predetermined number of positive reviews, number of item sales, etc. Another period achievement may be based on a ninety day or yearly rolling window, for example. Rolling period achievements may be adjusted, for example, to prevent decreasing or increasing an items rating due in part to factors that should have little to no influence on an item's rating. For example, in a food item taxonomy, the item ratings platform 400 may identify that demand for certain items (e.g., cold drinks, hot drinks, certain seasonal foods, etc.) changes throughout the seasons. Accordingly, the item ratings platform 400 may adjust one or more period achievement requirements for such items based on time of year, season, holidays, etc.

In one or more embodiments, the achievements requirements are assigned a point value to facilitate identifying higher performing items. For example, the higher performing items may be identified based on how many achievements requirements the item attains during a specified period. In some embodiments, the model establishes a period achievement associated with a predetermined number of positive ratings received during the period. The model determines whether any of the achievement requirements are met by the item. If one item receives a number of positive reviews exceeding the predetermined number, that item attains the period achievement and a predetermined number of points associated therewith. If the item does not receive the predetermined number of positive reviews, the item fails to attain the achievement. In some embodiments, achievement points may be scaled or weighted based on how close the item was to achieving the period achievement. In other embodiments, attaining the achievement may be an all or nothing scoring model. In addition, in certain embodiments, the achievement points attained for period achievements may be scaled or weighted based on age to emphasize recent ratings or reviews, thereby reducing an effect of older ratings and reviews for an item.

Formation of the dynamic item categories (see operation 514) plays an important role in the determination of achievement requirements, for example, by establishing a population of a dynamic item category. In one or more embodiments, all items within a dynamic item category are analyzed to identify an average performance of the category based on the specific achievement requirement. This analysis enables the models to identify the top performing items in the category.

Optionally, at operation 518, the item ratings platform 400 determines whether to recategorize any of the items and/or whether to create one or more new dynamic item categories for the item taxonomy (e.g., defining the new revised item taxonomy 700 (shown in FIG. 7)). More particularly, in one or more embodiments, the item ratings platform 400 identifies whether one or more of the items in a certain category are heavily (or disproportionately) influencing (or negatively affecting) the achievement points of the other items populating the category. For example, the item ratings platform 400 identifies a disproportionate negative impact on the achievement point values of a plurality of items assigned to an item category of the item taxonomy, wherein the disproportionate negative impact results from inclusion of one or more items of the plurality of items within the item category. The item ratings platform 400 may dynamically generate (whether based on user input or without user input, as described herein) new item categories in the item taxonomy, such as the revised item taxonomy 700, based on the identification of the disproportionate negative impact. For example, the item ratings platform 400 may assign the items causing the disproportionate negative impact and/or the negatively affected items to the new category. In other embodiments, the item ratings platform 400 may assign the items causing the disproportionate negative impact to one of the new item categories and the remaining items to the other new item category.

In an example, for one or more embodiments associated with a food item taxonomy, there may be a category for "Sandwiches." The sandwiches category may include both meat and meatless sandwiches. The item ratings platform 400 may identify that meat sandwiches are attaining higher achievements based on number of items sold vs. meatless sandwiches. Accordingly, meat sandwiches earn significantly more achievement points. Dynamically generating separate categories of sandwiches, such as "Sandwiches: Meat" and "Sandwiches: Meatless" allows the identification of high performers for both groupings. Consequently, "Sandwiches: Meat" achievement requirements for unit sales will increase, while "Sandwiches: Meatless" achievement requirements will decrease. Identifying such characteristics of items in a category facilitates affording higher achievement points to higher achieving meat sandwiches while also facilitating identification of higher performing meatless sandwiches, which were otherwise receiving low achievement points in the "Sandwiches" category due to inaccurate achievement requirements.

Similarly, item availability may also impact the item taxonomy, such as the initial item taxonomy 600 (shown in FIG. 6). In one embodiment, reduced or limited product availability may affect an item category within the item taxonomy. For example, a "Sandwiches: Meatless" item category may be dynamically updated to two (2) categories, "Sandwiches: Meatless" and "Sandwiches: Plant-based Meat," due to an influx of plant-based sandwiches. Subsequently, if there is a reduction in availability of plant-based sandwiches over an extended period, the item category "Sandwiches: Meatless" may be dynamically updated to include all items that were previously in the "Sandwiches: Plant-based Meat" category. The items that previously heavily (or disproportionately) influenced (or negatively affected) the achievement points would no longer be producing a negative impact.

At operation 520, the item ratings platform 400 generates a new item rating score for each item in the database, such as the data source 402. The item rating score is based on achievement points attained by the item according to the one or more established attainable achievement requirements. As described above, the achievement points may be separated into lifetime achievement requirements and period achievement requirements. In one or more aspects of the invention, the period achievement values diminish over time. Consequently, achievement points attained in previous periods may be worth less than more recent achievement points. This facilitates awarding an increased rating or score to items that are actively receiving high consumer ratings and awarding a decreased rating or score to items that may have high ratings in the past but may not be actively receiving high consumer ratings in the present. In certain embodiments, product availability may impact the item rating score. In one embodiment, an item rating score for an item may decrease over time if the item is no longer available. An item no longer available would be unable to earn new achievement points. Achievement points previously earned would continue to lose value within the rating score, which consequently would decrease the item rating score. The decreased item rating score would remove the item from potential top rated lists.

At operation 522, the item ratings platform 400 presents, for example, to a computing device, the item rating score for one or more selected items in the database. In addition, for each item and corresponding rating score, the item ratings platform 400 presents the achievement requirements and points attained by the respective item. Thus, a user can see what achievement requirements were attained by the items that account for the item's respective rating score.

As described above, in some embodiments, a user of the ratings platform 400 may search for item ratings for one or more items (e.g., top-rated items). The ratings platform 400, via its dynamic taxonomy, enables item-to-item comparison by grouping items with similar items that share one or more achievement requirements that are equally attainable. For example, achievement requirements are individually set per item based on the one or more of item ratings data, item category, time of year, merchant characteristics (e.g., type, accessibility, size, etc.), and the like. Thus, a taco sold by a merchant having a single location can be compared to a taco sold by a large merchant having nationwide establishments. Viewing the achievement points of each taco, for example, the user may see that a higher rated taco achieved its higher score by attaining comparatively more challenging achievements. For example, the higher rated taco may have received two hundred (200) positive user ratings while being served out of a single location, whereas the lower rated taco may have received six hundred (600) positive user ratings while being served at one hundred (100) locations. The achievements indicating that the smaller merchant attained a more difficult achievement than the larger merchant, and thereby receiving a higher item rating score.

Likewise, in example embodiments, merchant characteristics may cause adjustments to the item taxonomy due to the characteristics presenting variations of similar items. For example, a food item taxonomy consisting of a restaurant serving tortilla chips and salsa as well as a grocery store selling tortilla chips and salsas may produce revised item categories. Both the restaurant and the grocery store are selling similar items. The tortilla chip and salsa items sold by the restaurant are fresh and made on site while the grocery store tortilla chip and salsa items are manufactured and packaged at an alternate location. The item taxonomy may revise to chips/tortilla, packaged chips/tortilla, dips/salsa, and packaged dips/salsa respectively.

Further, in some embodiments, the item ratings platform 400 calculates the difficulty of achievement requirements of various merchant characteristics through analysis of data within the database 402. In the example above, the difficulty of achievement requirements earned by the higher rated taco may be calculated using item ratings data 404, merchant information 406, and items data 408. The calculations may determine the average taco sold by a merchant having a single location would produce fifty (50) positive user ratings and the average taco sold by a large merchant having one hundred (100) nationwide establishments would produce five hundred (500) positive user ratings. Thus, the system may conclude that the taco receiving two hundred (200) positive user ratings, one hundred and fifty (150) more ratings and a three hundred percent (300%) increase over an average taco of like characteristics, attained a more difficult achievement requirement than the larger merchant's taco receiving only six hundred (600) positive user ratings, one hundred (100) more ratings, and only a twenty percent (20%) increase over the average taco of like characteristics.

It is noted that any combination of ratings data, merchant characteristics, item category, time of year, etc. may be used by the item ratings platform 400 to determine one or more achievement requirements and/or item rating scores.

In example embodiments, the item ratings platform 400 provides the rating score by utilizing the item taxonomy 600. As noted above, the rating score may be referred to as a standardized rating score. Standardized rating scores allow comparison of like and non-like items contained in the item taxonomy. As described in the above examples, items of different characteristics and/or placed in different item taxonomy nodes (or branches) have different achievement requirements, adjusted based on various item data. The following example illustrates comparing three distinct items; a taco served by a small merchant from a single location (taco #1); a taco served by a large merchant from one hundred (100) locations (taco #2); and a chocolate cake served by a medium merchant from fifty (50) locations (chocolate cake #1). The two (2) tacos share the same node in the item taxonomy but include different merchant characteristics. The chocolate cake is placed in an entirely different node of the item taxonomy than the two (2) tacos. Known rating systems, where each item received the same number of positive user ratings as well as the same number of unit sales, will show all three (3) items performing similarly. For example, suppose each of the three (3) items receives about one thousand (1,000) positive user ratings and about five thousand (5,000) unit sales. The taco from the small merchant (i.e., taco #1), the taco from the large merchant (i.e., taco #2), and the chocolate cake from the medium merchant (i.e., chocolate cake #1), will all appear similar in typical rating systems.

In the item ratings platform 400, however, the AI/ML models 416, 418, and 420 calculate equally attainable achievement requirements of all three (3) items based on the items' respective nodes in the item taxonomy 600 and the items' corresponding respective merchant characteristics. The achievement requirements produced by the AI/ML models 416, 418, and 420 set the standards to enable disparate items throughout the item taxonomy to be compared. In the example, even with taco #1, taco #2, and chocolate cake #1 having the same sales and positive user ratings, the item ratings platform 400 may determine completely different rating scores for each item. For example, taco #1 may have a rating score of six hundred (600), while taco #2 may have a rating score of four hundred (400). The higher score for taco #1 may be based, in part, on its sales performance. Having the same number of unit sales and the same number of positive user ratings while only being sold from a single location is more difficult to attain than the taco #2 being sold by the larger merchant with one hundred (100) locations. The chocolate cake #1 may have a rating score of eight hundred (800). In general, tacos may not sell at the same rate nor receive the same ratio of user ratings per sale as chocolate cakes (or any other node in the item taxonomy). In this example, the AI/ML models 416, 418, and 420 may calculate the difficulty of a chocolate cake attaining one thousand (1,000) positive user ratings and five thousand (5,000) unit sales was being about twice as difficult to attain than taco #2 and about one and one third (1⅓) as difficult to attain than taco #1. Additionally, attainment of the unit sales and ratings by taco #1 may be determined to be about fifty percent (50%) more difficult than attainment of the unit sales and ratings by taco #2, resulting in the fifty percent (50%) rating score difference. Accordingly, with a standardized rating score for each item in the item taxonomy, a user can easily compare and conclude that chocolate cake #1 is a higher rated item than both tacos, while taco #1 is a higher rated taco than taco 2, even though each item has the same number of unit sales and positive user ratings.

Example Taxonomy Framework

Figure 7:
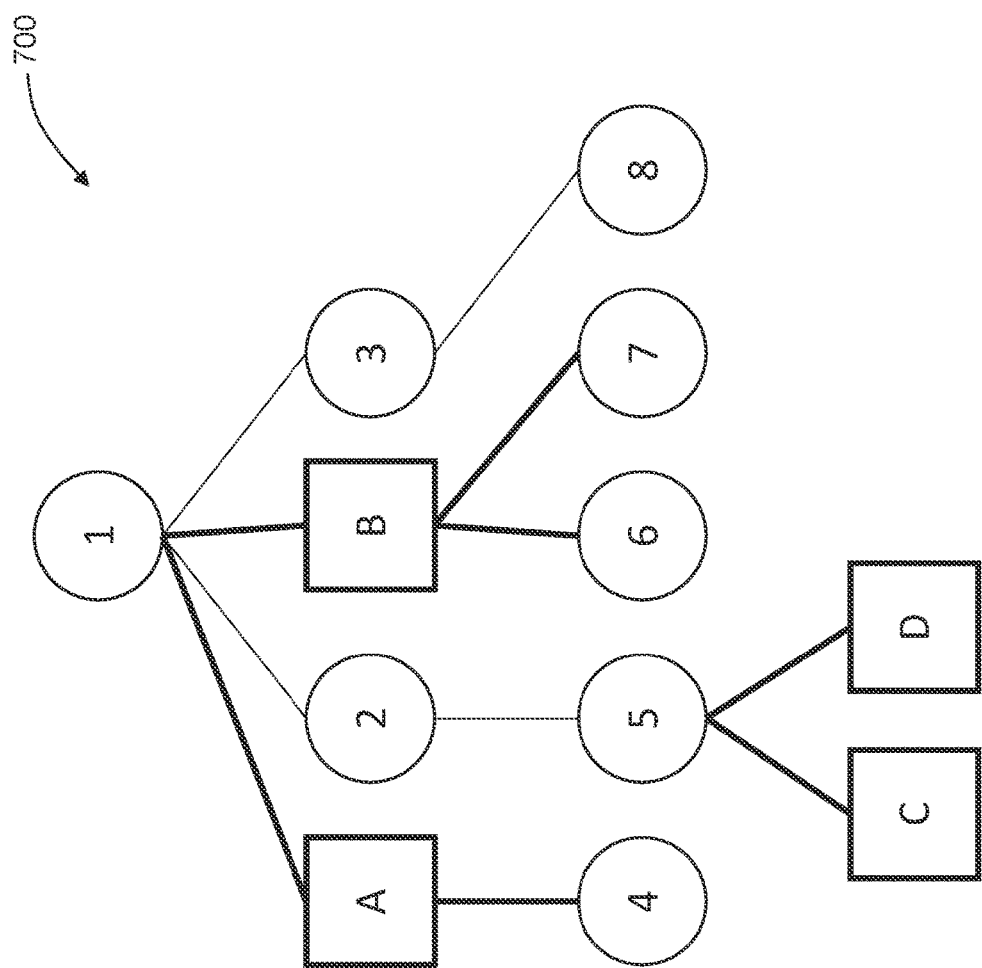
FIG. 7 is an example portion of a revised item taxonomy.

FIG. 6 is an example portion of an initial item taxonomy 600, represented in a tree-like structure. FIG. 7 is an example portion of a revised item taxonomy 700. The example described below is related to a food item taxonomy. It is noted, however, that the initial item taxonomy 600 may relate to any item or product, and is not limited to food items, as described herein. As described above, the item ratings platform 400 may be trained with a large sample of initial and/or historical items and/or image data with known characteristics or features, which is used to determine an initial item taxonomy 600 for a plurality of items or products. The initial item taxonomy 600 is a taxonomy with a multi-layered hierarchy. In an example multi-layered hierarchy, a first hierarchy level of the initial item taxonomy 600 may represent broad categories such as food, beverage, alcohol, etc. The first hierarchy level may include many categories. Each subsequent hierarchy level of the initial item taxonomy 600 below the first level is generally progressively more specific and typically includes fewer items. In an example embodiment, the second hierarchy level may represent general food categories (e.g., under a "food" category), such as Mexican food, Italian food, American food, Seafood, Pizza, Chinese food, etc. A third hierarchy level may represent types of items within a general food category. For example, under an American food category, the third level hierarchy may include steaks, burgers, sandwiches, salads, appetizers, etc. A fourth hierarchy level may represent sub-categories of items within an item type category. For example, under the item type of steaks, a fourth level hierarchy may include strip steak, Ribeye, T-bone, fillet, etc.

Referring to FIG. 6, the tree structure of the initial item taxonomy 600 includes a variety of nodes (i.e., categories), such as nodes 1-8. Each node (or category) is defined by node (or category) definition. In the exemplary embodiment, node 1 depicts a first level hierarchy, which can represent broad categories such as food, beverage, alcohol, etc., as noted above. Nodes 2 and 3 represent a second level hierarchy level. Nodes 2 and 3 may represent, for example, general food categories within a food category represented by node 1. Nodes 4, 5, 6, 7, and 8 depict a third level hierarchy. The third level hierarchy may represent sub-categories of items within a general food category represented by nodes 2 and 3. It is noted that the depicted initial item taxonomy 600 is merely an example. The initial item taxonomy 600 may be large, including hundreds of nodes and/or levels of the multi-layered hierarchy.

As described above with respect to operations 514 and/or 518, the item ratings platform 400 generates dynamic item categories, for example, based on additional information or data received. Referring to FIG. 7, in the example embodiment, the revised item taxonomy 700 is based on and includes at least a portion of the initial item taxonomy 600. The revised item taxonomy 700 includes one or more dynamic item categories, such as nodes A, B, C, and D. The dynamic item categories are defined by definitions, which may be revised versions of the parent category definition in some embodiments. In other embodiments, the dynamic item categories may be defined by new definitions that did not exist in the initial item taxonomy (e.g., entirely new items added by a merchant, for example). Based on newly received item data, such as consumer item ratings data 404 and/or analysis of achievement points, sales data, and the like, the item ratings platform 400 may add new categories and/or reorganize the existing items/categories. For example, in the depicted example of FIG. 7, a new dynamic item category represented by node A is created and node 4 is reorganized to depend therefrom. Likewise, a new dynamic item category represented by node B is created and nodes 6 and 7 are reorganized to depend therefrom. Furthermore, new items C and D are added to the tree structure, each depending from node 5.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

Certain embodiments are described herein as including logic or a number of routines, subroutines, applications, or computer-executable instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as a field-programmable gate array (FPGA), to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the term "processor" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor comprises a general-purpose processor configured using software, the general-purpose processor may be configured as respective different processors at different times. Software may accordingly configure the processor to constitute a particular hardware configuration at one instance of time and to constitute a different hardware configuration at a different instance of time.

Computer hardware components, such as transceiver elements, memory elements, processors, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

Having thus described various embodiments of the disclosure, what is claimed as new and desired to be protected by Letters Patent includes the following:

1. A server system comprising:
    a database storing a plurality of items and item data associated with the plurality of items, the plurality of items being arranged in an initial item taxonomy, wherein each respective item is assigned to a respective item category of the initial item taxonomy, the plurality of items including a first item assigned to a first initial item category of the initial item taxonomy; and
    a processor coupled to said database, said processor programmed to:
        provide a first item rating score for each item of the plurality of items in the initial item taxonomy, each first item rating score based on first achievement point values attained by the respective item according to respective one or more first achievement requirements, the respective first achievement requirements being based on the assigned respective item category of the respective item;
        receive a data submission from a user computing device, the data submission including additional item data, the additional item data comprising item ratings data corresponding to the first item in the initial item taxonomy;
        transmit the additional item data to a machine learning (ML) execution tool;
        using the ML execution tool, identify a computer model applicable to the additional item data;
        retrieve, by the ML execution tool, the item data from the database;
        process the item data and the additional item data using the identified computer model;

based on the processing:
revise the initial item taxonomy to create a revised item taxonomy including a new item category;
reassign the first item to the new item category of the revised item taxonomy; and
generate one or more second achievement requirements for each item of the plurality of items, each respective second achievement requirement being based on an assigned respective item category of the respective item in the revised item taxonomy;
for each item of the plurality of items, determine one or more second achievement point values for the one or more second achievement requirements; and
calculate a second item rating score for each item of the plurality of items based on the one or more second achievement point values and the one or more second achievement requirements.

2. The server system in accordance with claim 1, wherein the revised item taxonomy is based on and includes at least a portion of the initial item taxonomy.

3. The server system in accordance with claim 1, said processor programmed to transmit the second item rating score associated with one or more of the plurality of items to a computing device for presentation thereon.

4. The server system in accordance with claim 3, wherein transmitting the second item rating score comprises transmitting the one or more second achievement requirements and the one or more second achievement point values for the second item rating score.

5. The server system in accordance with claim 1, wherein the additional item data includes image data corresponding to the item.

6. The server system in accordance with claim 5, wherein said processor is programmed to perform the processing of the item data at least in part by processing the image data by the computer model being executed by said processor, the computer model including a machine learning model trained to at least partly define the new item category.

7. The server system in accordance with claim 1, said processor programmed to identify a disproportionate negative impact on the one or more second achievement point values of a second item of the plurality of items assigned to a second initial item category of the initial item taxonomy, the disproportionate negative impact resulting from inclusion of a third item of the plurality of items within the second initial item category.

8. The server system in accordance with claim 7, said processor programmed to:
generate a second new item category in the revised item taxonomy based on the identification of the disproportionate negative impact; and
assign one of the second item or the third item to the second new item category.

9. The server system in accordance with claim 1, said one or more second achievement requirements comprising one or more of the following: a lifetime achievement requirement and one or more period achievement requirements, wherein the one or more second achievement point values associated with the one or more period achievement requirements, respectively, are weighted based on recency of a period corresponding to a respective one of the period achievement requirements.

10. The server system in accordance with claim 1, said first initial item category and new item category being respectively defined by first and second category definitions,
said second category definition comprising a revised version of the first category definition.

11. A computer-implemented method performed by a server system, said method comprising:
providing a first item rating score for each item of a plurality of items stored in a database, the plurality of items being associated with item data stored in the database, the plurality of items being arranged in an initial item taxonomy, wherein each respective item is assigned to a respective item category of the initial item taxonomy, the plurality of items including a first item assigned to a first initial item category of the initial item taxonomy, each first item rating score based on first achievement point values attained by the respective item according to respective one or more first achievement requirements, the respective first achievement requirements being based on the assigned respective item category of the respective item;
receiving a data submission from a user computing device, the data submission including additional item data, the additional item data comprising item ratings data corresponding to the first item in the initial item taxonomy;
transmitting the additional item data to a machine learning (ML) execution tool;
using the ML execution tool, identifying a computer model applicable to the additional item data;
retrieving, by the ML execution tool, the item data from the database;
processing the item data and the additional item data using the identified computer model;
based on the processing:
revising the initial item taxonomy to create a revised item taxonomy including a new item category;
reassigning the first item to the new item category of the revised item taxonomy; and
generating one or more second achievement requirements for each item of the plurality of items, each respective second achievement requirement being based on an assigned respective item category of the respective item in the revised item taxonomy;
for each item of the plurality of items, determining one or more second achievement point values for the one or more second achievement requirements; and
calculating a second item rating score for each item of the plurality of items based on the one or more second achievement point values and the one or more second achievement requirements.

12. The computer-implemented method in accordance with claim 11, wherein the revised item taxonomy is based on and includes at least a portion of the initial item taxonomy.

13. The computer-implemented method in accordance with claim 11, further comprising transmitting the second item rating score associated with one or more of the plurality of items to a computing device for presentation thereon.

14. The computer-implemented method in accordance with claim 13, wherein transmitting the second item rating score comprises transmitting the one or more second achievement requirements and the one or more second achievement point values for the second item rating score.

15. The computer-implemented method in accordance with claim 11, wherein the additional item data includes image data corresponding to the item.

16. The computer-implemented method in accordance with claim 15, wherein processing the item data comprises processing the image data by the computer model being executed by the server system, the computer model including a machine learning model trained to at least partly define the new item category.

17. The computer-implemented method in accordance with claim 11, further comprising identifying a disproportionate negative impact on the one or more second achievement point values of a second of the plurality of items assigned to a second initial item category of the initial item taxonomy, the disproportionate negative impact resulting from inclusion of a third item of the plurality of items within the second initial item category.

18. The computer-implemented method in accordance with claim 17, further comprising:
  generating a second new item category in the revised item taxonomy based on the identification of the disproportionate negative impact; and
  assigning one of the second item or the third item to the second new item category.

19. The computer-implemented method in accordance with claim 11,
  wherein the one or more second achievement requirements comprises one or more of the following: a lifetime achievement requirement and one or more period achievement requirements,
  wherein the one or more second achievement point values associated with the one or more period achievement requirements, respectively, are weighted based on recency of a period corresponding to a respective one of the period achievement requirements.

20. The computer-implemented method in accordance with claim 11,
  wherein the first initial item category and the new item category are respectively defined by first and second category definitions,
  said second category definition comprising a revised version of the first category definition.

\* \* \* \* \*